United States Patent Office

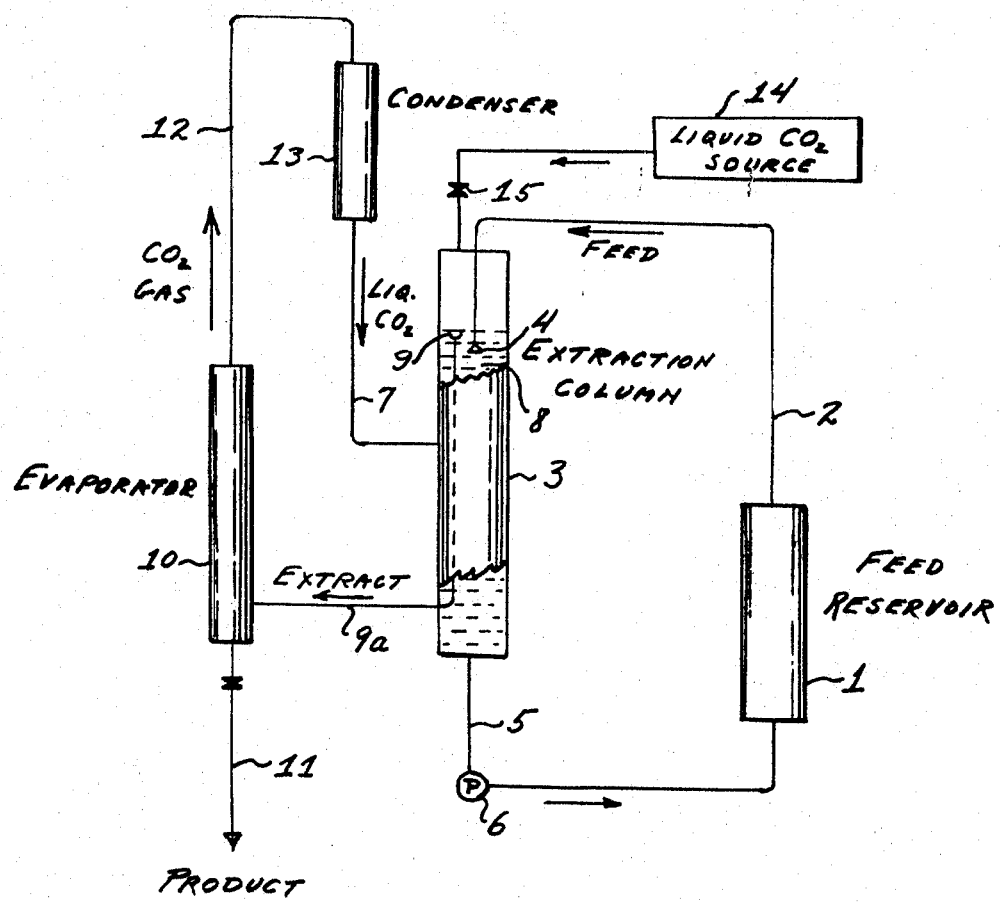

3,477,856
Patented Nov. 11, 1969

3,477,856
PROCESS FOR EXTRACTION OF FLAVORS
William G. Schultz, Richmond, Calif., assignor to the United States of America as represented by the Secretary of Agriculture
Filed Nov. 10, 1965, Ser. No. 507,170
Int. Cl. A23l *1/02*
U.S. Cl. 99—105      6 Claims

ABSTRACT OF THE DISCLOSURE

Process for isolating flavors from flavor-containing materials such as fruit juices, fruit essences, etc., which involves extracting the material with liquid carbon dioxide, separating the extract, and evaporating the $CO_2$ therefrom.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for isolating flavors from flavor-containing liquids, e.g., fruit juices, concentrates, essences, and the like. Further objects of the invention will be evident from the following description wherein parts and percentages are by weight, except for fold which is on a volume basis.

The figure in the annexed drawing is a schematic diagram or flow-sheet of a continuous extraction system embodying the principles of the invention.

It is well known that plant materials such as fruits contain small but significant amounts of volatile flavoring materials. These materials provide characteristic flavors to the fresh produce and are, in large measure, responsible for their appeal to the palate. When fresh produce is processed by conventional techniques such as dehydration, much of the volatile flavor is lost by evaporation and as a consequence the preserved product is flat or lacking in natural aroma. It is thus often desirable to restore flavor to the preserved products so that they will more closely resemble the fresh produce. In order to accomplish this it is necessary to isolate the natural flavoring components in a concentrated form suitable for incorporation into flavor-deficient products.

These compositions of volatile flavoring components, or essences as they are often termed, are conventionally made by distillation procedures. For example, fruit is reduced to a liquid state such as a juice and this juice is treated with steam to vaporize or strip off the flavoring components. The resulting vapor is condensed and then rectified in an efficient distillation column. The resulting essence does not contain solely the flavoring components but is largely water and alcohol with but a very minor proportion of the actual flavoring matter. Although the essences are concentrated to a substantial degree, representing a concentration of flavoring materials from 100 to 1000 times as great as in the original juice, at best they remain a solution of a very minor proportion of the flavoring components in a major proportion of water and alcohol. In this connection it must be realized that the flavoring components are not individual compounds but the flavor of each commodity is a complex mixture of many different compounds such as esters, ethers, aldehydes, ketones, etc., in a wide range of molecular weights. Purification by distillation can never be completely effective because many of the individual flavor components have boiling points close to that of alcohol and water or form azeotropes with water or alcohol. Thus, too sharp a fractionation will result in removal of important elevents of flavor. Also, there is the fact that the flavoring components are sensitive to heat so that even under the best of conditions chemical changes take place during the distillation with the result that the essences may acquire what may be termed a "cooked" aroma and lack the true natural bouquet of the fruit from which they were prepared.

In accordance with the present invention, volatile flavoring principles are isolated by a process of extraction, using a particular solvent—liquid $CO_2$—which has the unique ability to dissolve the volatile flavoring components while rejecting (not dissolving) the undesired components of the starting material, namely, water, carbohydrates, fruit acids (citric, tartaric, malic, etc.), inorganic salts, proteins, etc.

The process of the invention yields many advantages over prior procedures. Among these are the following:

A primary advantage of the process of the invention is that the flavoring substances are isolated in substantially pure form. In particular, the products are essentially free from water and contain, at most, negligible amounts of alcohol. In contrast, conventional essences are mainly water and alcohol and contain but a trace of flavoring components.

Another advantage is that the products of the invention have essentially the same flavor as the natural produce from which they are prepared; that is, they retain the aroma of the fresh produce instead of exhibiting the "cooked" aroma of conventional distilled essences.

A major factor which contributes to the advantage outlined immediately above is that in the isolation procedure of the invention the flavoring principles are not subjected to elevated temperatures. The extracting solvent used in accordance with the invention is effective in the extraction step at nonelevated temperatures and, moreover, can be removed from the resulting extracts at nonelevated temperatures.

Another advantage of the invention is that the solvent is noninflammable and nonexplosive. This greatly simplifies the extraction and solvent removal steps since there is no hazard of fire or explosion to contend with.

A further advantage to be mentioned is that the solvent used in accordance with the invention is essentially odorless so that it does not interfere with or alter the natural aroma of the flavoring principles. Also, the solvent is nontoxic so that its use with food products is safe.

Another item to be mentioned is that the solvent used in accordance with the invention does not emulsify with the material being extracted so that separation of the extract phase is accomplished readily and efficiently. This separation is particular aided by the relatively low density of liquid $CO_2$ (0.7 gm./ml. at 25° C.), whereby it tends to quickly layer out on top of the extraction zone. Such a rapid separation is to be contrasted with systems wherein solvents are used which have densities near that of water. In such cases, separation is slow and inefficient because the density differential is insufficient to adequately force the phase separation.

A further advantage to be noted is that liquid carbon dioxide is inert; that is, it does not react with the components of the material being extracted. Moreover, the $CO_2$ does not hydrolyze so that there is no contamination of the product and the recovered solvent can be used over and over again.

Another item is that liquid $CO_2$ has a low viscosity: one-twentieth that of water. As a result, it can penetrate very readily into the material to be extracted whereby to yield rapid and effective results.

The process of the invention may be applied to all kinds of materials which contain volatile flavoring components. Typical examples of such materials are fruits such as apples, pears, peaches, pineapple, berries, etc.; vegetables such as tomatoes, carrots, celery, onions, garlic, watercress, etc.; spices such as pepper, cinnamon, bay, etc.; tea; coffee; cocoa; meats; and other materials of plant or animal origin.

The extraction may be applied to material in a solid or liquid condition. With some commodities—for example, spices, coffee, tea, onions, garlic, etc.—it is preferred to apply the extraction to the commodity in a solid state. Naturally, to increase its surface area the commodity is preferably first reduced to a subdivided condition as by mincing, grinding, flaking, or other conventional comminution technique. In the case of fruits, tomatoes, and other pulpy or juicy materials, it is preferred to reduce them to a liquid state and apply the extraction to the resulting liquid. Where the material is already a liquid—for example, a fruit juice, essence, concentrate, or syrup—it is extracted in such condition.

In a typical application of the process of the invention, a fruit or vegetable is reduced to a liquid condition by subjecting the produce to such operations as reaming, pressing, macerating, crushing, comminuting, extracting with water or other procedure appropriate to the material at hand. The liquid preparation is then contacted with the liquid $CO_2$ solvent. For best results it is preferred that the extraction be performed in a countercurrent system. An embodiment of such mode of procedure is detailed hereinbelow. After the extraction has been accomplished the solvent phase containing dissolved volatile flavoring principles is separated from residual liquid and this solvent phase is subjected to evaporative conditions to vaporize the solvent and leave the flavoring principles as a residue. Since carbon dioxide is normally a gas, whereas the flavoring principles are liquids, the removal of $CO_2$ from the solvent phase is accomplished very readily by a small increase in temperature sufficient to convert the $CO_2$ to the gas state. In the alternative, one can use a system wherein the pressure is decreased to effect the same change in state of aggregation. In cases where the starting material contains a substantial proportion of water (as with a juice), the extract after removal of $CO_2$ wil contain the flavoring substance, plus some water—usually no greater in volume than that of the flavoring substance. This offers no complication, however, as the system is in two phases. Thus on standing, even momentarily, the system will separate into a water phase and an oily phase of the flavoring substance. By decantation, the latter can be easily separated from the aqueous phase. The aqueous phase is discarded or recycled to the extraction system.

The conditions of the extraction—such as proportion of materials, temperatures, pressure, etc.—are not critical and may be varied to suit individual circumstances. The amount of extracting solvent is not a critical factor; generally one uses about 0.1 to 10 parts of solvent per part of liquid to be extracted. To maintain the $CO_2$ as a liquid, the system is kept under superatmospheric pressure. Generally pressures of about 900–1000 p.s.i.g. are adequate and preferred. Usually for convenience the extraction is conducted at about room temperature. This, however, is not a critical item and one may use lower or higher temperatures. Regarding the use of lower temperatures: In extracting liquid materials it is preferred that the temperature be not so low that the starting liquid becomes frozen. It is obvious that the freezing point of the liquid to be extracted will vary markedly, depending on such factors as the concentration of sugar or other solutes therein, and, for example, with juices of high sugar concentration one might be able to conduct the extraction at, say, minus 10° C., whereas other juices of lesser sugar concentration might require a higher extraction temperature, say 1° C., so that they will remain liquid. In the case where the extraction is applied to a solid material, temperatures below the freezing point can be used and may even be preferred in special cases where it is desired to inhibit enzyme and/or microbiological action.

In the alternative, the extraction of liquid or solid materials may be conducted at temperatures above room temperature. Usually, it is preferred that the extraction be carried out below the critical temperature (31° C.) of $CO_2$. However, it is within the broad purview of the invention to use temperatures above this level where the $CO_2$ exists as a supercritical fluid. In any event, it is obvious that the temperature should not be so high as to damage the flavor to be isolated. It is obvious that as the operating temperature is altered a corresponding change in pressure may be required to maintain the $CO_2$ in the liquid phase. This is, however, no problem as the minimum pressure required to maintain $CO_2$ in a liquid state at a given temperature can be ascertained from standard tables of physical properties of $CO_2$. It is obvious that conventional procedures, such as repeated application, may be applied to obtain exhaustive extraction of the flavoring principles. After evaporation of the solvent from the extract phase, the flavoring principles are obtained as a residue in a highly concentrated form essentially free from water, alcohol, sugars, fruit acids, and other non-flavor components and possessing the true natural aroma of the produce from which they were extracted. The products may be employed for flavoring products of all kinds, for example, concentrated fruit juices, dehydrated fruit juices, gelatin dessert mixes, pudding mixes, cake mixes, confections such as ices, sherbets, ice cream. The products made in accordance with the invention from such vegetables as onions, garlic, parsley, celery, pimientos, tomatos, and chives, may be used in flavoring such products as salad dressings, cheese dips, cheeses, sauces for alimentary pastes, dehydrated soups, pizza mixes, and the like. Products made from other materials such as coffee, tea, spices, etc., may be employed in flavor-fortifying beverages, ice creams, candy, and other confections, cake mixes, etc.

In the annexed drawing there is depicted a schematic diagram of a system for countercurrent extraction in accordance with the principles of the invention. Referring to the drawing, the system includes a reservoir 1 for holding a supply of the liquid to be extracted, e.g., applie juice or apple essence. The liquid flows from reservoir 1 through conduit 2 to extraction column 3. To disperse the liquid in finely-divided form there is provided a conventional spray head 4. The liquid, being of greater density than the extracting solvent, flows downwardly through the extraction column. The resulting raffinate—the liquid deprived of flavoring components—leaves the column by conduit 5 from whence it is forced by pump 6 back to reservoir 1 and eventually recycled to extraction column 3 as above described.

Liquid $CO_2$ enters extraction column 3 via conduit 7. Within the column, the liquid $CO_2$ contacts the liquid sprayed out of nozzle 4, forming a liquid $CO_2$—flavor phase 8, which rises to the top of the system because of its low density. This extract phase 8 flows via adjustable intake 9 and conduit 9a to evaporator 10 which may take the form of a column heated by a jacket through which warm water is circulated. In the evaporator, the carbon dioxide is vaporized while the extracted flavor collects at the base of the apparatus, from which it may be removed via conduit 11. The $CO_2$ gas flows through conduit 12 to condenser 13 where it is cooled to a liquid state and recycled in such form back to the extraction system via conduit 7.

When the system is started up, the appropriate amount of liquid $CO_2$ is added from source 14. Also, during operation, valve 15 is opened from time to time to bleed liquid $CO_2$ into the system to compensate for any losses, for example, through the joints and seals in the apparatus.

The invention is further demonstrated by the following illustrative example:

The starting material was 9.5 liters of commercial 150-fold apple (Red Delicious) essence. This liquid was extracted in a countercurrent system as shown in the annexed drawing. Extraction column 3 was 18" tall, square in cross-section (⅝" x ⅝", inside). Conditions of the run were as follows:

Pressure, 915 p.s.i.g.; temperature, in extraction column 4, 25° C.; in evaporator 10, about 28° C.; in condenser 13, 21° C.

Rate of flow of liquid $CO_2$ to the extractor was 9 cc./min., feed of essence, 33 cc./min. Time of run was 24 hours.

The product (from conduit 11) was collected, allowed to stand a few seconds to permit separation of an aqueous phase, and the oily phase (3 cc.) was collected. The latter represented the isolated apple flavor principles; it was free from water and contained a negligible amount of alcohol. It was a very potent source of apple flavor and could be used in very minute proportions (for example, 1 part per 750,000 parts) to restore the flavor in apple products such as juices and concentrates that were lacking in natural bouquet. The potency of the material can be visualized from the fact that 1 cc. thereof represented the flavor principles in 600,000 cc. of single-strength apple juice.

Having thus described the invention, what is claimed is:

1. A process for isolating the volatile flavoring components from a fruit juice containing the same, which comprises
    extracting the juice with liquid $CO_2$ at a pressure of about 900–1000 p.s.i.g. and a temperature below 31° C., under which conditions the $CO_2$ remains in the liquid phase,
    separating the extract phase containing dissolved flavoring components from residual juice, and
    evaporating $CO_2$ from the separated extract phase.

2. The process of claim 1 wherein the fruit juice is apple juice.

3. A process for isolating the volatile flavoring components from a liquid fruit essence containing the same, which comprises
    extracting the essence with liquid $CO_2$ at a pressure of about 900–1000 p.s.i.g. and a temperature below 31° C., under which conditions the $CO_2$ remains in the liquid phase,
    separating the extract phase containing dissolved flavoring components from residual essence, and
    evaporating $CO_2$ from the separated extract phase.

4. The process of claim 3 wherein the fruit essence is apple essence.

5. A continuous process for isolating volatile flavoring components from a fruit juice, which comprises
    continuously flowing liquid $CO_2$ into an extraction zone maintained at a pressure of about 900–1000 p.s.i.g. and a temperature below 31° C., under which conditions the $CO_2$ remains in the liquid phase,
    continuously and concomitantly flowing the juice into the extraction zone,
    continuously withdrawing extract phase from the top of the extraction zone,
    continuously flowing said extract phase into an evaporation zone wherein $CO_2$ is vaporized from the said extract phase, and
    withdrawing from the evaporation zone the residual material constituting the isolated volatile flavoring components.

6. A continuous process for isolating volatile flavoring components from a liquid fruit essence, which comprises
    continuously flowing liquid $CO_2$ into an extraction zone maintained at a pressure of about 900–1000 p.s.i.g. and a temperature below 31° C., under which conditions the $CO_2$ remains in the liquid phase,
    continuously and concomitantly flowing the essence into the extraction zone,
    continuously withdrawing extract phase from the top of the extraction zone,
    continuously flowing said extract phase into an evaporation zone wherein $CO_2$ is vaporized from the said extract phase, and
    withdrawing from the evaporation zone the residual material constituting the isolated volatile flavoring components.

References Cited

UNITED STATES PATENTS

| | | | |
|---|---|---|---|
| 2,145,395 | 1/1939 | Horvath | 99—71 |
| 2,345,378 | 3/1944 | Brandt | 99—71 |
| 3,113,031 | 12/1963 | Stanley et al. | 99—140 |

OTHER REFERENCES

Sivetz, Coffee Processing Technology, vol. 2, Avis Publishing Co. Inc., Westport, Conn., 1963, pp. 4, 5, 21, 22.

A. LOUIS MONACELL, Primary Examiner

J. M. HUNTER, Assistant Examiner

U.S. Cl. X.R.

99—22, 71, 77, 103, 110, 140